United States Patent Office 3,527,919
Patented Sept. 8, 1970

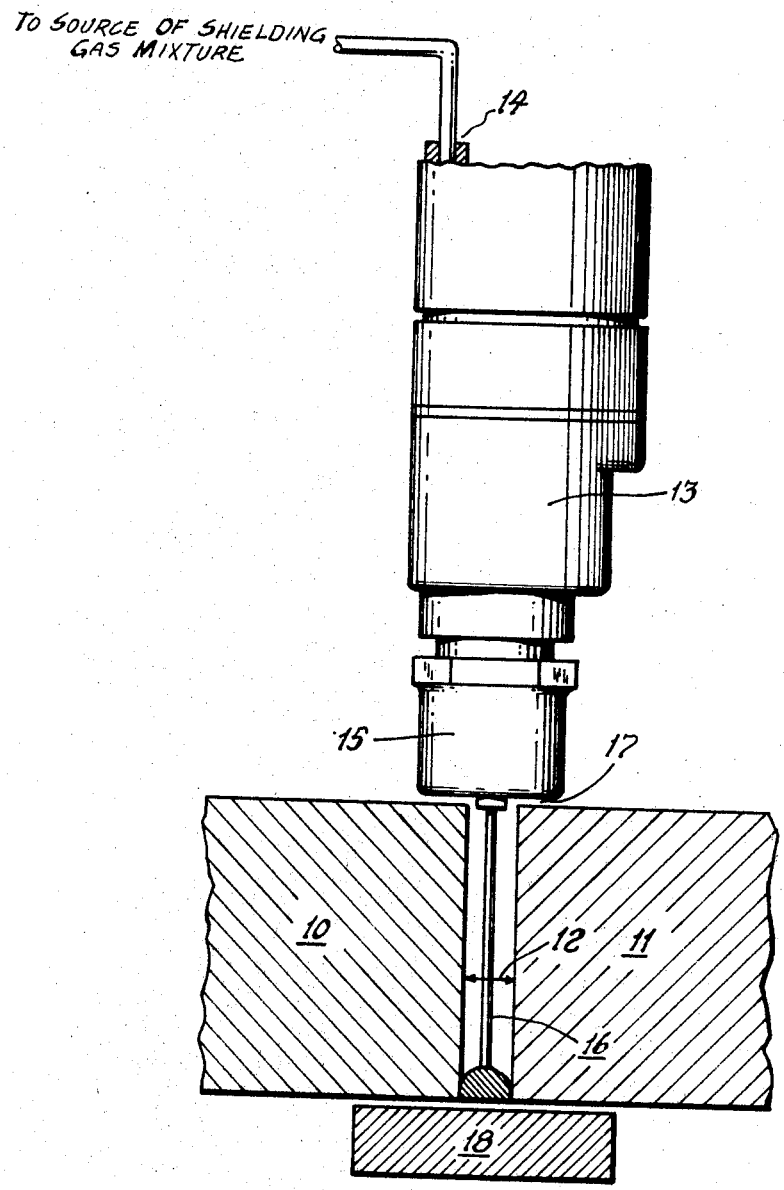

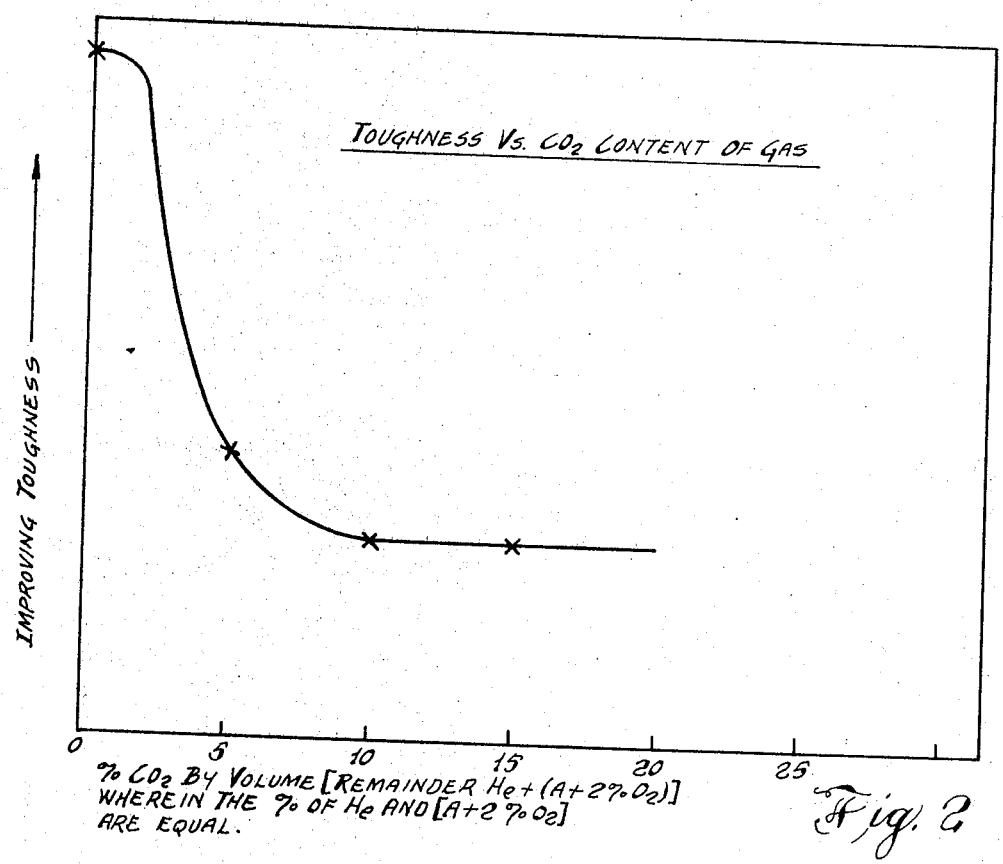
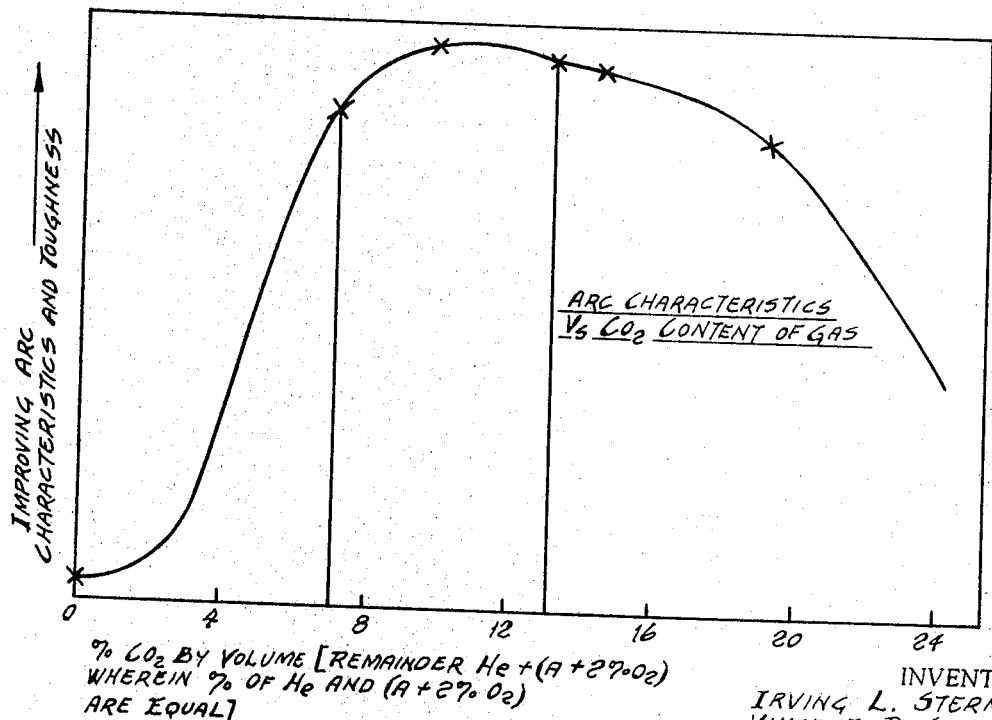

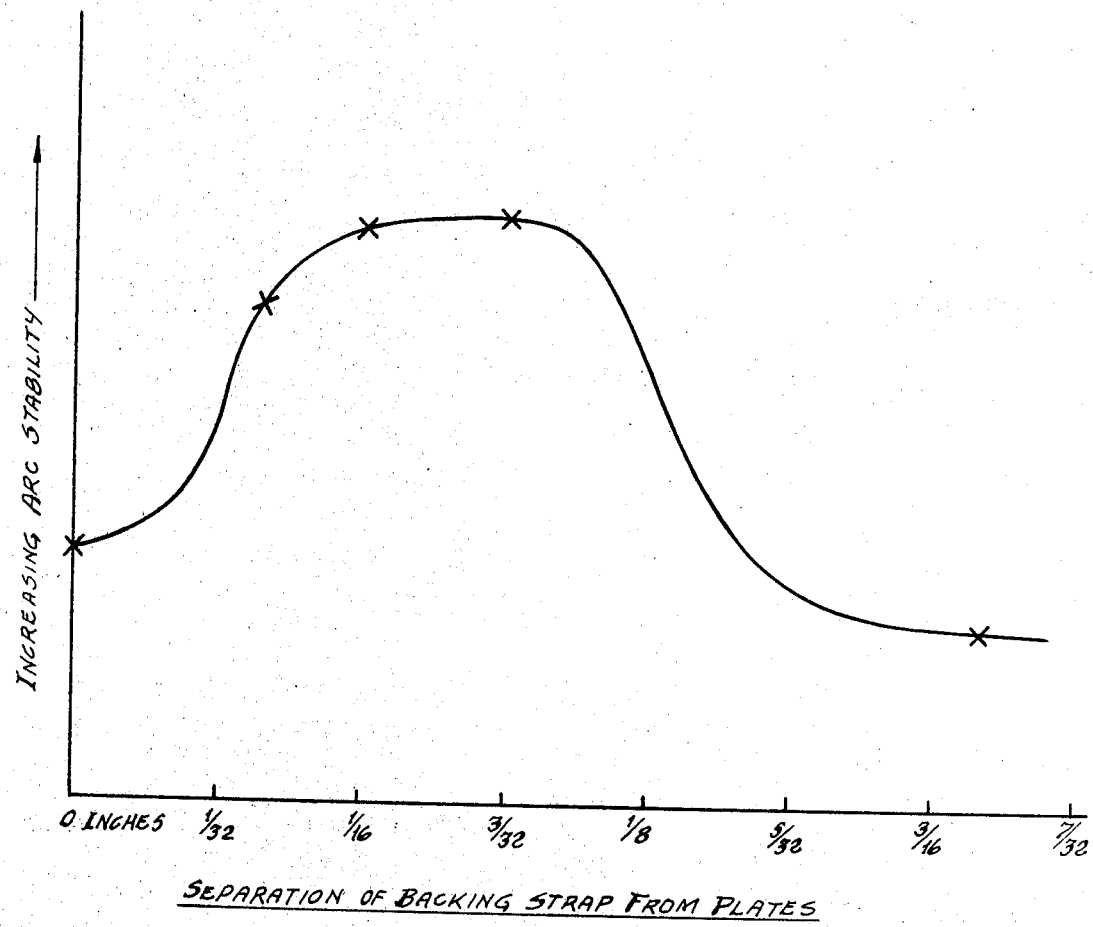

3,527,919
EXTENDED ELECTRODE WELDING TECHNIQUE
Irving L. Stern, Huntington, and Vincent D. Schaper, Jamaica, N.Y., assignors to the United States of America as represented by the Secretary of the Navy
Filed Feb. 5, 1969, Ser. No. 796,666
Int. Cl. B23k 9/02
U.S. Cl. 219—137                                             4 Claims

ABSTRACT OF THE DISCLOSURE

Square butt joint welding of relatively thick steel plates employing an extended electrode into the root opening is accomplished by making the first weld pass in a gas atmosphere of approximately 46% (argon+2% oxygen)+ 46% helium+8% carbon dioxide. A backing strap spaced from the plates by about 1/32 to 1/8 inch and a gas flow of 100 to 110 cubic feet per hour set the parameters for the initial preferred conditions. Where the welding depth is reduced to less than 1½ inches the carbon dioxide is deleted from the gas mixture and the gas flow adjusted within the range of 100 to 200 cu. ft./hr.

---

The invention described herein may be manufactured and used by or for the Government of the United States of America for governmental purposes without the payment of any royalties thereon or therefor.

BACKGROUND OF THE INVENTION

Field of the invention

The present invention relates to arc welding in general and more particularly pertains to welding of relatively thick close square butt steel joints wherein the welding operation is confined to a narrow deep groove or gap and is carried out in a gaseous atmosphere.

Description of the prior art

In the field of narrow gap welding of thick steel plates it has been the practice to carry out the welding in an inert atmosphere using extremely thin long welding wires and employing automated equipment. Such devices have been unsatisfactory in that they require large, complex and expensive equipment, are restricted to automated operation, can only be used for long weld runs. Additionally they require appreciable set-up time and uniform joint surfaces and fits, and cannot be used in any confined space.

SUMMARY OF THE INVENTION

The general purpose of this invention is to provide apparatus and technique for narrow deep gap welding of steel plates that has all the advantages of similarly employed prior techniques and has none of the above described disadvantages. To attain this, the present invention provides a unique welding arrangement wherein the thick plates to be butt welded are separated by approximately ¼ of an inch and the backing strap is spaced a fraction of an inch from the plates while one specific gas mixture including $CO_2$ at a flow rate of 100–110 cu. ft./ hr. is supplied during the initial welding operation. Another gas mixture and/or flow rate are supplied for subsequent welding at depths less than 1½ inches. This method results in extremely tough, inexpensive welds which may be carried out manually.

An object of the present invention to provide method and apparatus for welding of thick steel plates which employs relatively inexpensive and simple reliable equipment and can be either manual or automated for both long and short runs.

Another object is to provide a technique of narrow gap welding not restricted to machined and uniform fits, requiring a minimum of set-up time while adaptable to confined spaces.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 1 is a cross-sectional view of the welding apparatus and the relative position of the parts when used in accordance with the principle of this invention;

FIG. 2 is a graph showing the relation between percentage of carbon dioxide in the gas mixture and the steel weld toughness;

FIG. 3 is a graphic plot of arc penetration characteristic against percentage of carbon dioxide in the gas mixture;

FIG. 4 is a graphic plot of backing strap separation against arc performance.

BRIEF DESCRIPTION OF THE PREFERRED EMBODIMENT

In the embodiment of FIG. 1 two high strength steel plates 10 and 11 in proximate butting relation are to be welded along their separation gap 12 whose opening can range from ¼" to 7/16". A standard welding gun 13 having an inlet 14 for a gas mixture which is emitted within the hollow shielding cup 15 and directed into the gap 12. The thin welding wire 16 extends through the cup 15 outwardly of the gun and into the opening 12. The lower edge 17 of the cup is positioned proximate the upper surfaces of the plates but less than ¼" therefrom. A backing strap 18 is provided opposite the lower end of the opening 12 lengthwise of the separation between the plates. This backing strap is slightly separated from the plates by a distance within the range of 1/32" to 1/8".

In practicing the welding technique of this invention, the welding gun 13 is supported so that a slight separation exists between the cup 15 and the upper plate surface while the extended electrode 16 is centrally disposed in the opening and reaches to the bottom of the opening. A specific shielding gas mixture is supplied through the gun into the cup 15 and then forced into the gap opening and partially released through the separation between the backing strap and the plates. Clearly, after the first lengthwise welding pass the shielding gas cannot exit past the backing strap. Various parameters including the separation of the shielding cup 15 and the backing strap 18 from the plates have already been set forth. There are, however, other factors and conditions which have been found to directly affect the resultant weld. Initially, consideration must be directed toward the welding shielding gas mixture and its parameters. Since the steel plates are of the high strength variety, then toughness of the weld is an important factor. Examination of the graph plot illustrated in FIG. 2, shows that with an increasing proportion of carbon dioxide in the gas mixture the weld toughness decreases. Applicants have discovered that this relationship is not linear, and that in the area of 0–10% $CO_2$ by volume, the toughness decreases with increasing $CO_2$ and then above 10% it remains relatively constant so that it is advantageous to select a gas mixture having less than 10% $CO_2$ by volume, if this were the only factor of interest.

In view of the restricted welding volume and the proximate position of the welding wire to the side walls (plates) the arc characteristic and penetration are important factors. FIG. 3 illustrates these parameters vs. percentage of $CO_2$. Clearly delineated therein is the fact that optimum characteristics are attained where the percentage of carbon dioxide is approximately 7% to 13%.

An additional factor whose limits already have been set forth, is the backing strap separation. This is shown in FIG. 4 wherein the optimum separation lies between 1/32 and 1/8 of an inch. Although not illustrated the optimum shielding gas flow was ascertained for the conditions under which this inventive technique is employed. The flow rate was found to be directly related to the weld properties and the best over all properties were obtained for a flow rate of 100-110 cubic feet per hour.

Excellent welds have been obtained for butt welding of thick plates under the following conditions:

Where the depth is in excess of 1.5 inches and plates 1/4-1/2 of an inch apart:

*Gas mixture.*—46% (argon+2% oxygen)+46% helium+8% carbon dioxide by volume

*Flow rate.*—100-110 cu. ft./hr. with a shielding cup of 1 inch diameter

*Back strap separation.*—1/32-1/8 inch

Where the depth is less than 1.5 inches the carbon dioxide is deleted from the shielding gas mixture. Therefore successive weld passes are made under the initial conditions for deep welds and as the depth becomes less than 1 1/2 inches the gas mixture is altered by eliminating the carbon dioxide. With the stability of the arc and its pentration, the welding process is unaffected by the arc inadvertently striking the side walls, thus permitting both manual and automated operation.

A unique feature of this method and apparatus is that if the extended welding electrode accidentally contacts the side wall, the welding filler wire is dispersed and vaporized and welding can continue without interruption. In currently available processes, a similar striking of the electrode against the side wall results in their burn back of the electrode into the welding gun or freezing of the electrode against the side wall. In either case, a significant work interruption which often involves equipment repair is required.

It should be understood, of course, that the foregoing disclosure relates to only a preferred embodiment of the invention and that numerous modifications or alterations may be made therein without departing from the spirit and the scope of the invention as set forth in the appended claims.

We claim:

1. An improved arc welding method for butt joining metal plates over 1 1/2 inches thick, disposed in spaced relation to define a narrow gap separation therebetween, said method comprising the steps of:
    establishing said gap of substantially uniform width with a separation of between 1/4 and 1/2 of an inch and having two open faces,
    partially closing one open face of said gap with a backing strap separated from said plates by 1/32 to 1/8 of an inch,
    initially supplying a shielding gas mixture having between 7 and 10% by volume of carbon dioxide into said gap at a flow rate of 100-110 cubic feet per hour,
    feeding into said gap from the other open face thereof a welding rod material of small cross section establishing an arc between the welding rod material and the metal plates defining the gap, and maintaining an arc within said gap and progressively filling said gap,
    removing said carbon dioxide from said gas mixture when the depth of said gap is less than 1 1/2 inches and completing the weldment.

2. The method according to claim 1 wherein said initial shielding gas mixture is, by volume, 46% (argon+2% oxygen), 46% helium and 8% carbon dioxide.

3. The method according to claim 2 wherein said gas mixture is applied through an inverted cup disposed coaxially about staid welding rod and spaced from said plates.

4. The method accordingly to claim 3 wherein said cup is approximately 1 inch in diameter at its base.

References Cited

UNITED STATES PATENTS

| | | | |
|---|---|---|---|
| 1,834,505 | 12/1931 | Stresay | 219—137 |
| 2,753,427 | 7/1956 | Yenni et al. | 219—74 |
| 2,920,181 | 1/1960 | Rockefeller et al. | 219—137 X |
| 3,035,154 | 5/1962 | Wolff et al. | 219—74 |
| 3,137,782 | 6/1964 | Rieppel et al. | 219—61 |
| 3,328,556 | 6/1967 | Nelson et al. | 219—61 X |
| 3,350,539 | 10/1967 | Manz et al. | 219—137 |

JOSEPH V. TRUHE, Primary Examiner

G. A. MONTANYE, Assistant Examiner

U.S. Cl. X.R.

219—61, 74